(12) United States Patent
Okano et al.

(10) Patent No.: US 6,418,857 B1
(45) Date of Patent: Jul. 16, 2002

(54) SUPERCONDUCTIVE MAGNETIC LEVITATION TRANSPORTATION SYSTEM

(75) Inventors: Makoto Okano, Tokyo; Noriharu Tamada, Ibaraki, both of (JP)

(73) Assignee: Secretary of Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/650,331

(22) Filed: Aug. 29, 2000

(30) Foreign Application Priority Data

Aug. 31, 1999 (JP) .......................................... 11-244174

(51) Int. Cl.⁷ ............................................... B60L 13/04
(52) U.S. Cl. ....................................... 104/281; 104/284
(58) Field of Search ............................. 104/138.1, 281, 104/290, 282, 284; 62/51.1, 47.1

(56) References Cited

U.S. PATENT DOCUMENTS

| | | | |
|---|---|---|---|
| 3,352,512 A | * 11/1967 | James, Sr. ............... | 104/138.1 |
| 3,954,064 A | 5/1976 | Minovitch | |
| 5,094,173 A | 3/1992 | Tada et al. | |
| 5,146,853 A | 9/1992 | Suppes | |
| 5,189,961 A | * 3/1993 | Fujie .......................... | 104/281 |
| 5,222,437 A | * 6/1993 | Shibata et al. .............. | 104/282 |
| 5,251,741 A | * 10/1993 | Morishita et al. .......... | 198/619 |
| 5,287,026 A | * 2/1994 | Ogihara et al. ............. | 104/281 |
| 5,433,155 A | * 7/1995 | O'Neill et al. .............. | 104/282 |
| 5,521,570 A | * 5/1996 | Ito et al. ..................... | 104/285 |
| 5,543,768 A | * 8/1996 | Murakami et al. .......... | 335/216 |
| 5,628,252 A | * 5/1997 | Kuznetsov .................. | 104/284 |
| 5,653,175 A | * 8/1997 | Milligan ..................... | 104/138.1 |
| 5,657,697 A | * 8/1997 | Murai ......................... | 104/284 |
| 5,722,326 A | * 3/1998 | Post ............................ | 104/281 |
| 5,757,089 A | * 5/1998 | Ishizuka ..................... | 307/147 |
| 5,869,432 A | * 2/1999 | Aksay et al. ............... | 505/450 |
| 5,923,109 A | * 7/1999 | Higuchi et al. ............. | 310/90.5 |
| 5,950,543 A | * 9/1999 | Oster ......................... | 104/138.1 |
| 5,966,944 A | * 10/1999 | Inoue et al. ................ | 62/51.1 |

FOREIGN PATENT DOCUMENTS

| | | |
|---|---|---|
| DE | 40 28 292 A1 | 3/1992 |
| JP | 1-229761 | 9/1989 |
| JP | 4-15158 | 1/1992 |
| JP | 5-64314 | 3/1993 |
| JP | 6-613413 | 5/1994 |
| JP | 7-193913 | 7/1995 |

\* cited by examiner

Primary Examiner—S. Joseph Morano
Assistant Examiner—Lars A. Olson
(74) Attorney, Agent, or Firm—Frishauf, Holtz, Goodman & Chick, P.C.

(57) ABSTRACT

A transportation system with high-efficiency and large-capacity utilizing potential energy. A transportation vehicle travels at a high speed by potential energy by a level difference on a magnetic levitation guide disposed in a vacuum transportation passage to transport transportation cargoes to a destination location. The transportation vehicle is levitated on the magnetic levitation guide non-contactingly and with a low frictional resistance utilizing a superconduction. Superconductive magnetic levitation holds the transportation vehicle at a stable floated position mainly utilizing a binding force by the pinning effect of a superconductor.

9 Claims, 5 Drawing Sheets

SUPERCONDUCTIVE MAGNETIC LEVITATION TRANSPORTATION SYSTEM

This application is based on Japanese Patent Application No. 11-244174 (1999) filed Aug. 31, 1999, the content of which is incorporated hereinto by reference.

BACKGROUND OF THE INVENTION

1. Field of the Invention

The present invention relates to a superconductive magnetic levitation transportation system, more specifically to a superconductive magnetic levitation transportation system which performs short to long distance transportation of cargoes such as mails, foods, or the like with saved energy and without causing pollution by using superconductive magnetic levitation for utilizing potential energy as a drive source of a transportation vehicle.

2. Description of the Related Art

Heretofore, methods for transporting mails or foods perform the transportation in the air, on the roads or rails utilizing airplanes, ships, automobiles, railways, and the like.

In such conventional transportation methods, since transportation is performed in the air, on the roads or rails while bearing large amounts of loss, there are required large amounts of fuel costs and labor costs, as well as substantial production costs of the transportation vehicles, furthermore, there are substantial effects on the environmental degradation.

Since prior art methods for transporting a cargo by airplanes, ships, or automobiles utilize petroleum as drive energy, they considerably tend to have adverse effects on the environment such as emission of hazardous substances by exhaust gases, acceleration of the global warming phenomenon by generation of $CO_2$, air pollution by abrasion dust of tires. Further, for railways, a great importance is attached to environmental pollution due to nuclear power generation and thermal power generation for producing the electric energy. Still further, each of these transportation methods is very large in air drag loss for traveling in the air and frictional loss, and dissipates a large amount of petroleum which is concerned about its storage amount in the future.

SUMMARY OF THE INVENTION

With the aim of solving the above-described prior art problems, it is an object of the present invention to provide an energy-saving superconductive magnetic levitation transportation system which uses high-temperature superconductive magnetic levitation, which is extremely small in bearing loss, for non-contact levitation of a transportation vehicle, making a transportation passage in which the transportation vehicle travels to a vacuum or a reduced pressure atmosphere in order to remarkably reduce air drag loss, to reduce the drag during traveling to nearly zero, thereby supplying almost of the traveling drive force by the potential energy.

A yet further object of the present invention is to provide an energy-saving superconductive magnetic levitation transportation system which enables large-capacity transportation by connecting or providing a plurality of small-capacity transportation vehicles.

To accomplish the above objects, in a superconductive magnetic levitation transportation system according to the present invention, a transportation vehicle having a transportation cabin containing transportation cargoes is non-contactingly levitated by utilizing the pinning effect which is one of superconduction phenomena, traveled on a rail provided with permanent magnets or electromagnets in a traveling direction disposed in a vacuum transportation passage provided with a level difference between a start location and a destination location, and stopped at the destination location by absorbing traveling kinetic energy with potential energy when, approaching the destination location.

Further, for loading and unloading the transportation cargoes and performing other works, the start location and the destination location are provided with vacuum doors capable of closing a transportation pipe end (stop location of the transportation vehicle), and inside of which has a structure capable of being opened to the atmosphere and made to a vacuum. Still further, potential energy corresponding to the loss generated during traveling can be recovered by carrying the transportation vehicle to a high position utilizing an elevator and the like.

According to an aspect of the present invention, there is provided a superconductive magnetic levitation transportation system, comprising:

a transportation vehicle provided with a transportation cabin loading a transportation cargo, a first magnetic levitation member including a superconductive member, and a first coupling coil;

a magnetic levitation guide, having a second magnetic levitation member including a magnet opposing to the first magnetic levitation member and a second coupling coil magnetically coupled with the first coupling coil, for levitating the transportation vehicle; and a transportation passage surrounding the transportation vehicle and the magnetic levitation guide in a vacuum or a reduced pressure atmosphere and disposed to have a level difference;

wherein the transportation vehicle is levitated on the magnetic levitation guide by the superconductive pinning effect of the first magnetic levitation member of the transportation vehicle and the second magnetic levitation member of the magnetic levitation guide so that the transportation vehicle is traveled by potential energy according to the disposition of the transportation passage, and the transportation vehicle is stopped driving, held or positioned by the first coupling coil of the transportation vehicle and the second coupling coil of the magnetic levitation guide.

Here, the transportation vehicle preferably comprises a cold accumulator disposed in close contact with the superconductive member and a refrigerator or a coolant for cooling the cold accumulator.

The magnet may be a plurality of permanent magnets disposed along the magnetic levitation guide in a traveling direction with the same magnetic polarities.

Further, the magnet may be a plurality of electromagnets disposed along the magnetic levitation guide in the traveling direction.

Still further, the superconductive member is preferably a high-temperature superconductor having a strong pinning force (high critical current density), for example, an yttrium type oxide superconductor ($YBa_2Cu_3O_x$) or a samarium type oxide superconductor ($SmBa_2Cu_3O_x$).

Yet further, the transportation vehicle may comprise the first magnetic levitation member and the first coupling coil disposed on one side with respect to the levitating direction and further a third magnetic levitation member and a third coupling coil disposed on the other side, and the magnetic levitation guide may comprise the second magnetic levitation member and the second coupling coil opposing to the first magnetic levitation member and the first coupling coil of the transportation vehicle, and a fourth magnetic levitation member and a fourth coupling coil opposing to the third magnetic levitation member and the third coupling coil of the transportation vehicle.

Yet further, the transportation vehicle may further comprise a fifth magnetic levitation member and a fifth coupling coil on a side to which a centrifugal force is applied where the transportation passage is bent, the magnetic levitation guide may further comprise a sixth magnetic levitation member opposing the fifth magnetic levitation member of the transportation vehicle.

Yet further, the transportation vehicle preferably has connection parts having a superconductor at one end with respect to the traveling direction and a magnet at the other end, and a plurality of the transportation vehicles may be connected by the connection parts.

Yet further, the transportation passage preferably further has at opposite ends a start area and an arrival area partitioned by vacuum doors.

Yet further, there may be provided a second magnetic levitation guide disposed to be connected or branched to the magnetic levitation guide such that potential energy of an arrival area of the second magnetic levitation guide is different from that of the magnetic levitation guide.

As described above, with the present invention, a large-capacity transportation can be possible by using high-temperature superconductive magnetic levitation in the bearings of the transportation vehicle to achieve high efficiency with remarkable reduction of bearing loss, and by connecting a plurality of small-capacity transportation vehicles.

According to the present invention, by achieving a high-efficiency and high-capacity superconductive magnetic levitation transportation system, since external driving power is almost unnecessary and there is almost no environmental pollution, the transportation system can greatly contribute to energy saving and solution of environmental problem.

Further, according to the present invention, it is possible to increase the natural frequency of each of the transportation vehicles and, since the kinetic energy of each transportation vehicle is not so large, when a malfunction occurs, energy can be dispersed and distributed, thereby minimizing effects on other system or peripheral apparatus.

DETAILED DESCRIPTION OF THE PREFERRED EMBODIMENT

Figure 1A:
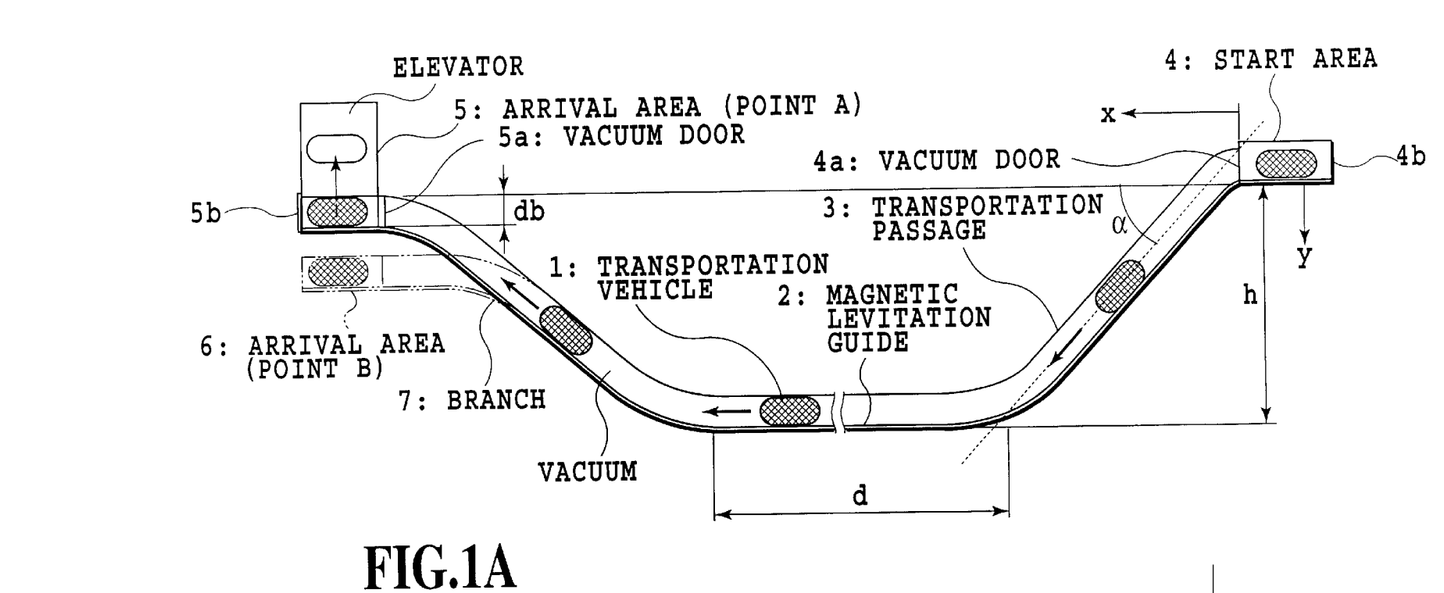
FIGS. 1A and 1B are schematic construction diagrams of a superconductive magnetic levitation transportation system according to the present invention.

FIG. 1A shows a schematic construction diagram of a superconductive magnetic levitation transportation system according to the present invention. The superconductive magnetic levitation transportation system of the present invention can be installed, for example, on the ground, underground, in the sea or a lake, as well as on side or under walls of highways.

In FIG. 1A, the superconductive magnetic levitation transportation system comprises a single or a plurality of transportation vehicles 1, a magnetic levitation guide 2 provided with permanent magnets or electromagnets, and a transportation passage 3. At opposite ends of the transportation passage 3, a start area 4 and an arrival area 5 are provided. Further, the start area 4 has first and second vacuum doors 4a and 4b, and the arrival area 5 has first and second vacuum doors 5a and 5b, respectively.

The transportation vehicle 1, in a state that the first vacuum door 4a on the transportation passage 3 side is closed, and the second vacuum door 4b on the carry-in or carry-out side is open, is guided to the start area 4, thereafter, the second vacuum door 4b is closed, and inside of the start area 4 is evacuated. Next, the first vacuum door 4a is open, the transportation vehicle 1 is guided into the transportation passage 3. The transportation vehicle 1 is levitating or floating non-contactingly with low frictional resistance. Superconductive magnetic levitation holds the transportation vehicle 1 at a stable position utilizing mainly a binding force by the pinning effect of a superconductor.

The transportation vehicle 1 having mass m is accelerated to a high speed in a descending part by potential energy as a level difference on the magnetic levitation guide 2 in the transportation passage from the start area disposed at the highest position in the system, travels at a constant speed in a halfway flat d part, ascends in the vicinity of a destination location to store kinetic energy of the transportation vehicle as potential energy, decreases in speed and stops. At the arrival area 5, the second vacuum door 5b is closed and the first vacuum door 5a on the transportation passage 3 side is open, and the inside is in a vacuum state. When the transportation vehicle 1 arrives at the arrival area 5, the first vacuum door 5a is closed to make the inside of the arrival area 5 same state as the external atmosphere, thereafter, the second vacuum door 5b is opened, and carry-out or carry-in of the transported cargo can be performed. Further, as necessary, the transportation vehicle 1 is guided to a predetermined height by an elevator, transportation means or the like, where the potential energy lost in the outward way is recovered, which is used in the return way (not shown). Also in the return way, a start area and an arrival area are provided with a level difference same as in the outward way.

The transportation passage 3 further may comprise a branch part 7, whereby enabling transportation to an arrival area 6 at a B point. In this case, braking is possible by means of coupling coils 22 of the transportation vehicle 1 and the magnetic levitation guide 2 or an appropriate braking means provided at the arrival area 6.

Figure 1B:
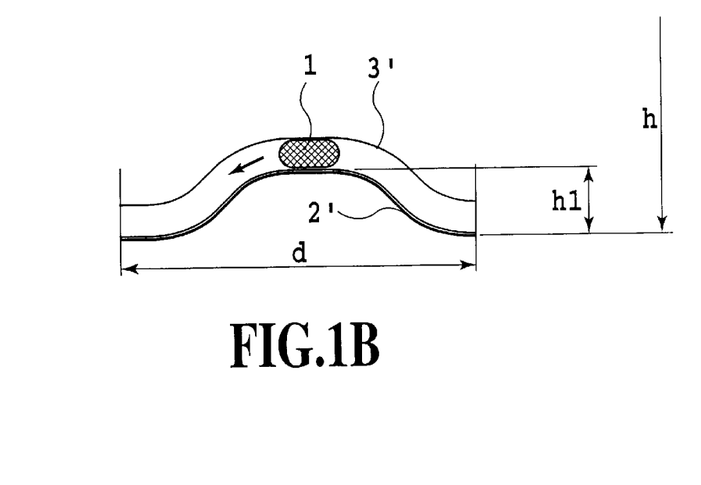

FIG. 1B shows a modified construction diagram of the transportation passage. As shown in FIG. 1B, since a transportation passages 3' and a second magnetic levitation guide 2' are very small in traveling loss even if there are high and low positions repeatedly, kinetic energy is converted to potential energy during traveling towards a high position and the speed decreases, however, stored potential energy increases the speed in a descending part, so that there is almost no effect unless there is too large positional difference. In short, if the level difference is set such that potential energy by a height difference between the start area 4 and the arrival area 5 is greater than potential energy corresponding to total loss in the transportation passage 3, some level differences in the course of the transportation passage 3 would cause no problem.

In such a system, for a single transportation vehicle 1, a traveling speed of the transportation vehicle on a distance d of a flat straight passage and a time from the start position to the destination position are calculated as follows. That is, referring to FIG. 1, a distance (height) h of falling at a constant acceleration a in a time t is;

$$h = \tfrac{1}{2} at^2$$

the acceleration a is represented from a gradient α and gravitational acceleration g;

$$a = g \cdot \sin \alpha$$

a speed v after a time of t second is;

$$v = \sqrt{2ax}$$

From these formulae, as an example, how long of time in minute it takes in traveling on a straight line of a distance d=100 km is calculated in the case where α=5°, h=200 m.

First, a time required from the inclined part to the straight part is from $$a = 9.8 \times \sin 5° = 0.854 \text{ m/s}^2 \text{ and } x = 200/\tan 5° = 2286 \text{ m } t = \sqrt{(2x/a)} = (2 \times 2286 / 0.854) = 73.2 \text{ s}.$$

Therefore, the speed v attained in the straight part is $$v = \sqrt{(2 \times 0.854 \times 2286)} = 62.5 \text{ m/s} = 225 \text{ km/h}.$$

From the above, the transportation vehicle 1 travels the distance d of 100 km in 27 minutes.

When the transportation vehicle 1 has loss during traveling, lost energy is as follows. For example, since a thing of weight 1 ton at a height 200 m has potential energy of $2 \times 10^5$ kgm, if loss due to air drag loss is assumed as zero (because of traveling in vacuum) and loss due to vibration of the superconductive bearing is assumed as 10 W for a 1 ton vehicle, total loss generated during traveling is $10 \times (2 \times 73.2 + 27 \times 60) = 17664$ J. It is represented as 1.8 m in level difference.

Since the loss is generated in the superconductor, the vehicle must be cooled to its extent, however, cooling is unnecessary if cooling storage capacity of the transportation vehicle is large.

Yet further, the loss generated during traveling decreases the speed of the vehicle. Since kinetic energy e of a 1 ton vehicle traveling at a speed of 225 km/h is $$e = \tfrac{1}{2} mv^2 = \tfrac{1}{2} \times 1000 / 9.8 \times 62.5^2 = 200000 \text{ (kgm)} = 1962000 \text{ (J)},$$

when the total loss of 17664J is consumed, the speed is $$v = \sqrt{(2 \times (1962000 - 17664))} = 62.36 \text{ m/s} \approx 224 \text{ km/h},$$

which is a speed decrease of about 1 km/h.

When the loss is 50W per ton, total loss during traveling is 88320 J, which corresponds to a level difference of 9 m, and the speed is v=61 km/h=220 km/h, a decrease of 5 km/h.

Figure 2:
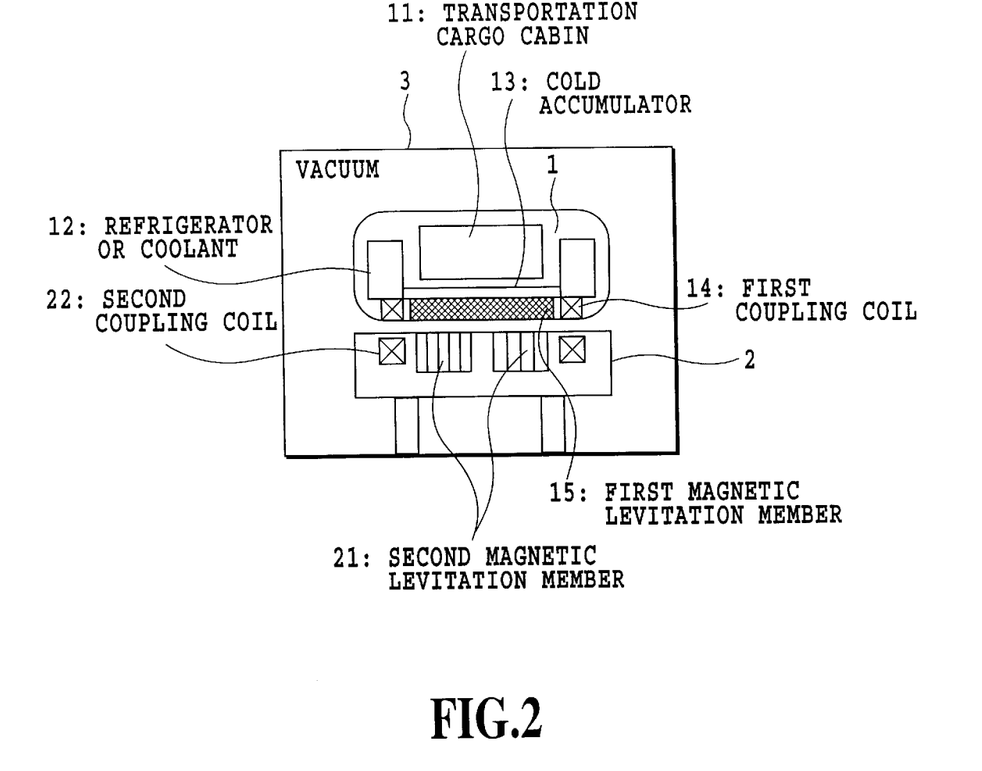
FIG. 2 is a schematic cross-section of the superconductive magnetic levitation transportation system according to the present invention.

FIG. 2 shows an example of detailed construction of the superconductive magnetic levitation transportation system according to the present invention.

The transportation vehicle 1 comprises a cargo cabin 11 disposed at the center of the vehicle, a refrigerator or a coolant supply source 12 disposed on opposite sides of the vehicle 1, a cold accumulator 13 disposed at the lower central part of the vehicle, a first coupling coil 14 disposed at lower both sides of the vehicle, and a first magnetic levitation member 15. The cargo cabin 11 is a space for loading cargoes. The refrigerator or coolant supply source 12 is a mechanism for cooling the cold accumulator 13, in which an appropriate chemical or electric refrigerator or a coolant such as liquid nitrogen is used. Further, it is also possible to cool the cargoes by cooling the cargo cabin 11 with the refrigerator or coolant supply source 12. The cold accumulator 13 is disposed almost in close contact with a superconductor constituting the first magnetic levitation member 15 to cool down the member.

The first coupling coil 14 is made of a normal conductor wire or a superconductor wire, which is a magnetic coupling coil used for traveling control such as stop at the arrival position:and emergency stop or driving during traveling. The first magnetic levitation member 15 is a plate-formed superconductor (especially a high-temperature superconductor) disposed below the cold accumulator 13 at the lower,center of the vehicle which, as will be described later, non-contactingly levitates the transportation vehicle 1 for moving it at a high speed on the magnetic levitation guide 2.

Here, as the superconductor used in the present invention, in view of effectively utilizing the pinning effect, is preferably a yttrium type oxide superconductor ($YBa_2Cu_3O_x$) or a samarium type oxide superconductor ($SmBa_2Cu_3O_x$) at present, however, if a superconductor is developed which has a large critical current density, it may be used. Further, since the critical temperature is about 90K, the cooling temperature may be maintained at the liquid nitrogen temperature of 77K.

A stationary side magnetic levitation guide 2 comprises a second magnetic levitation member 21 at a position opposing the first magnetic levitation member 15, that is, at the central upper part of the guide 2 along the traveling passage, and a second coupling coil 22 at a position opposing the first coupling coil 14, that is, at the upper part of opposite sides of the guide 2 along the traveling passage. As the second magnetic levitation member 21, mainly a permanent magnet is used, and a plurality of magnets are disposed with the same polarities so as to obtain a uniform magnetic field distribution for preventing occurrence of traveling drag. The second coupling coil 22, made of a normal conductor wire or a superconductor wire as for the first coupling coil 14, is for traveling control and driving, which is controlled according to a control signal from an external control apparatus.

The stationary side magnetic levitation guide 2 is fixed into the transportation passage 3. Further, inside of the transportation passage 3 is in a vacuum state or a reduced pressure atmosphere to suppress air drag loss by high-speed traveling of the transportation vehicle 1 as possible and to suppress influx of heat as possible to the superconductive magnetic levitation portion of the transportation vehicle 1.

Here, as an example, a case will be described in which a superconductor is disposed on the transportation vehicle 1 side, and, on the other hand, a permanent magnet for levitation is disposed on the magnetic levitation guide 2 side. In this case, to decrease the temperature of the first magnetic levitation member 15 (superconductor) on the transportation vehicle 1 side below the critical temperature, using the refrigerator or the coolant supply source 12 disposed on the transportation vehicle 1, the cold accumulator 13 disposed around the superconductor is cooled and further the first magnetic levitation member 15 is cooled. In this cooling, for example, at the start area 4, in a state that the transportation vehicle 1 is floated by inserting a spacer between the magnetic levitation guide 2 and the transportation vehicle 1, the superconductor 15 is cooled below the critical temperature. By the above method, the superconductor 15 transforms from a normal conductive state to a superconductive state, magnetic flux of the permanent magnet 21 is trapped at pinning points of the superconductor 15 by the pinning effect. When the spacer is removed and the vehicle weight is applied, a superconductive current flows in the superconductor 15 to generate a magnetic force corresponding to the weight, thereby achieving magnetic levitation by a repulsive force to the magnetic field of the permanent magnet 21. In this case, a restoring force is generated by the trapped magnetic field also in the lateral direction, generating a holding force for preventing deviation in the lateral direction.

Thus, to the transportation vehicle 1 in the state of being magnetically levitated on the magnetic levitation guide 2 at the start area 4, a magnetic field can be generated by flowing a control current in the second coupling coil 22 from an external control apparatus to drive the transportation vehicle 1 by magnetic coupling with the first coupling coil 14 of the transportation vehicle 1, thereby starting traveling.

Further, when the vehicle is in the stop state at the start location or the arrival location, the refrigerator 12 is operated by an external power supply, and a coolant is stored in the cold accumulator 13 having cooling storage capacity of several hours to maintain the superconductor 15 in the superconductive state, operation of the refrigerator during traveling can be eliminated.

Figure 3:
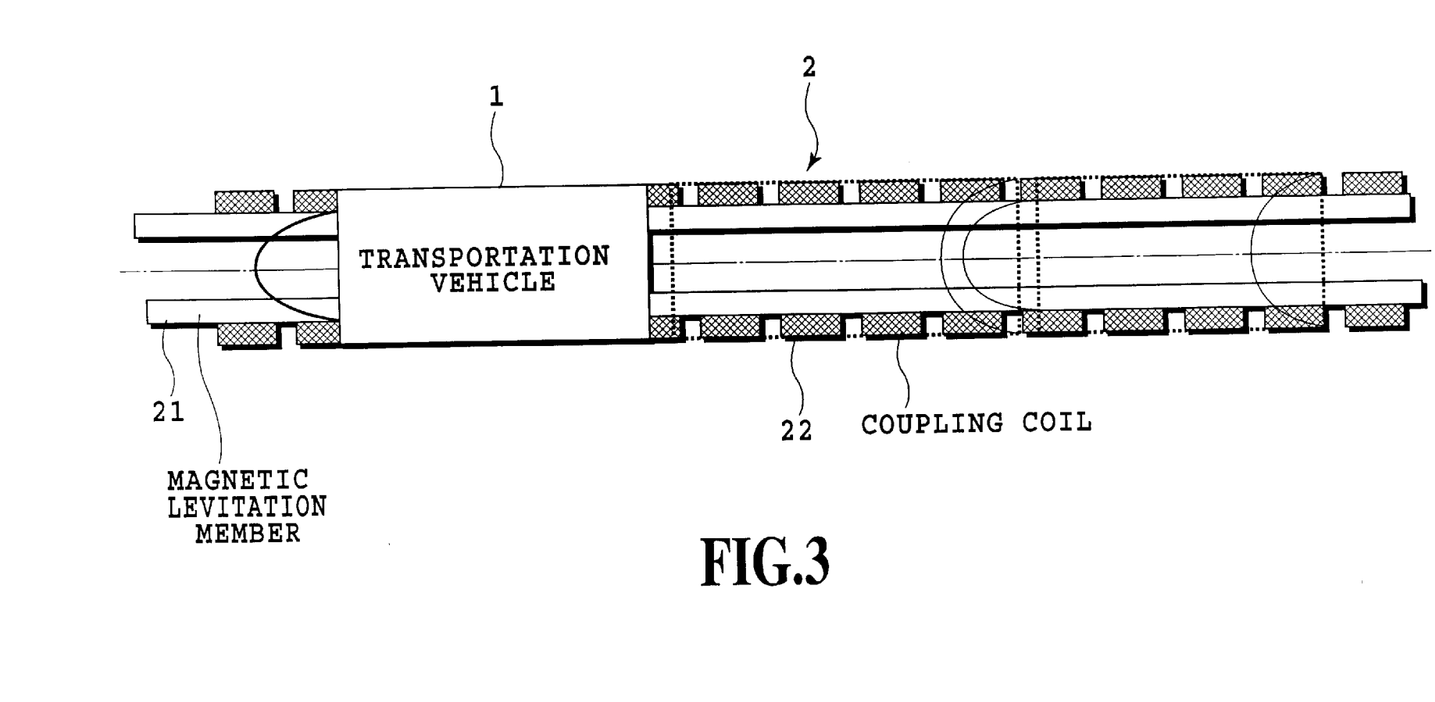
FIG. 3 is a diagram for explaining a magnetic levitation guide provided with a coupling coil.

FIG. 3 shows an explanatory diagram in which an electromagnet for magnetic field generation as the second magnetic levitation member 21 is disposed on the magnetic levitation guide 2.

As in the case of a permanent magnet, a plurality of electromagnets for generating magnetic fields are provided instead of the permanent magnets along the traveling passage. Generation of magnetic field by the electromagnets is performed in synchronization with a moving position of the transportation vehicle 1. Of course, it is no problem even if there is always magnetic fields, however, there is power loss in the coils, a synchronous operation is advantageous. Further, the second coupling coil 22 may also be used as an induction coil of these electromagnets.

Figure 4A:
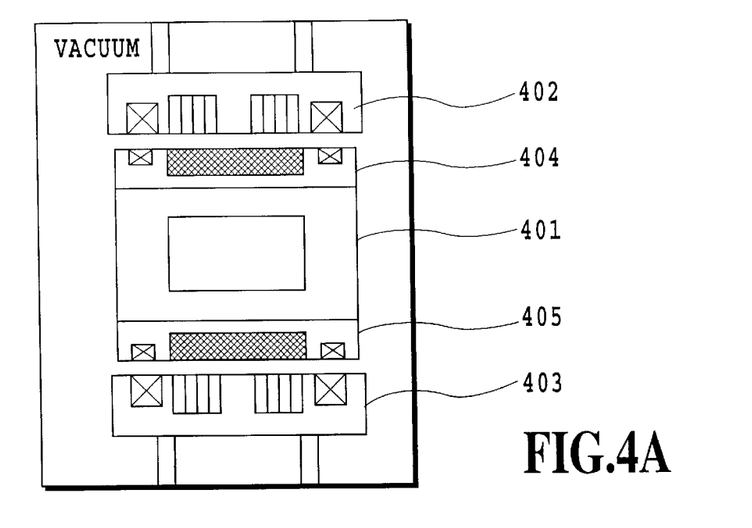
FIGS. 4A–4C are structural diagrams in a transportation passage for other embodiments of a transportation vehicle and a magnetic levitation guide.
Figure 4B:
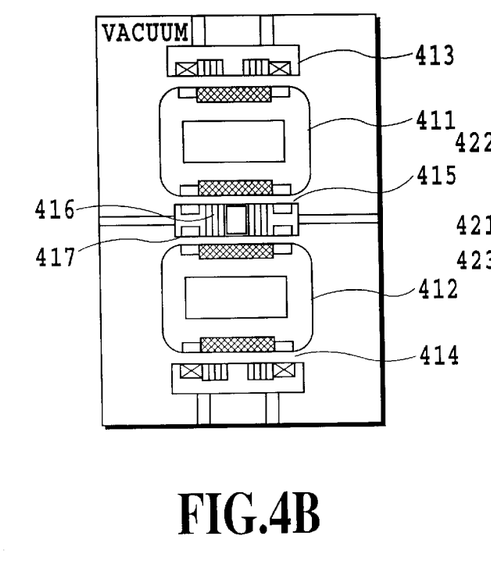
Figure 4C:
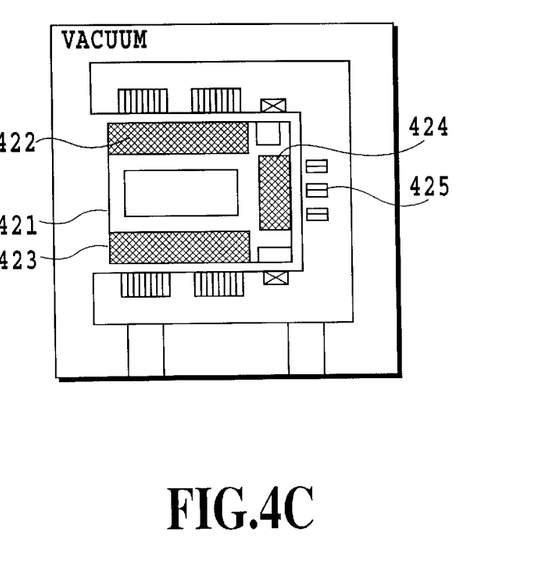

FIG. 4 shows structural diagrams in the transportation passage according to another aspect of the transportation vehicle and the magnetic levitation guide.

FIG. 4A shows a structure in which magnetic levitation members and the first coupling coils 404 and 405 are provided on both upper and lower sides of the transportation vehicle 401 and, corresponding to the above, magnetic levitation guides 402 and 403 are provided on both upper and lower sides.

FIG. 4B shows a structure in which transportation vehicles 411 and 412 are disposed in parallel in two stages, and magnetic levitation guides 413, 414 and 415 are provided. As to the intermediate positioned magnetic levitation guide 415, a magnetic levitation member 416 can be used commonly to both transportation vehicles 411 and 412. Further, the magnetic levitation guide 415 is provided with coupling coils 417 and the like separately for both transportation vehicles 411 and 412.

FIG. 4C is a diagram showing a structure in which to the structure shown in FIG. 4A, a structure for strongly supporting a centrifugal force even further is added. That is, in addition to upward and downward directed magnetic levitation members 422 and 423 of the transportation vehicle 421, a magnetic levitation member 424 provided at the side part acts to the centrifugal force of the transportation vehicle by a magnetic levitation member 425 of the lateral magnetic levitation guide.

Figure 5A:
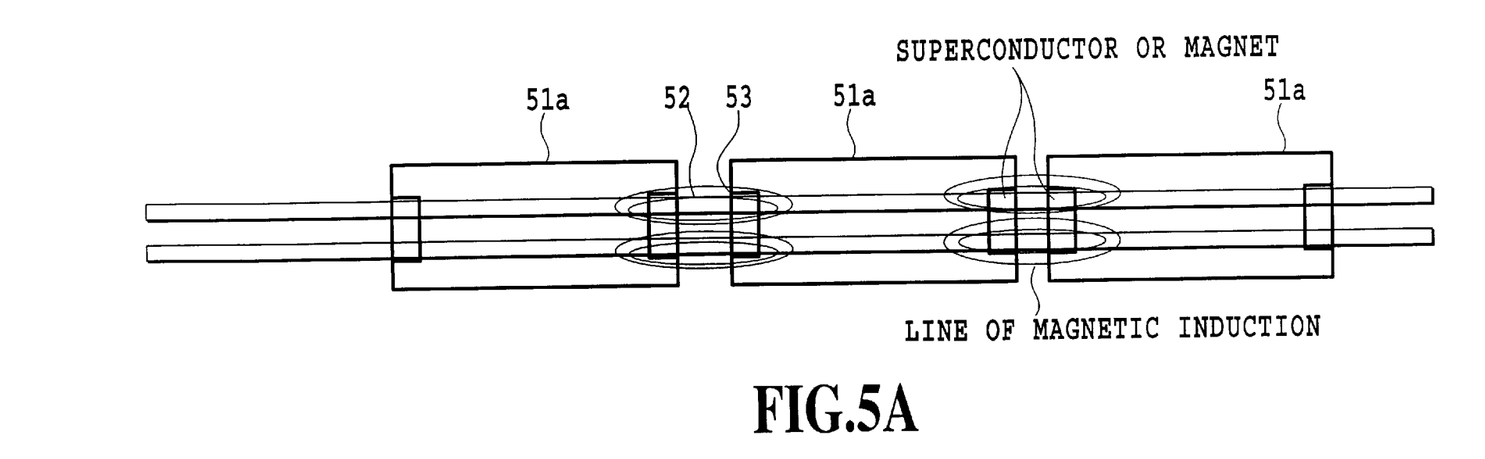
FIGS. 5A and 5B are diagrams showing the structure of a connection part for connecting respective transportation vehicles.
Figure 5B:
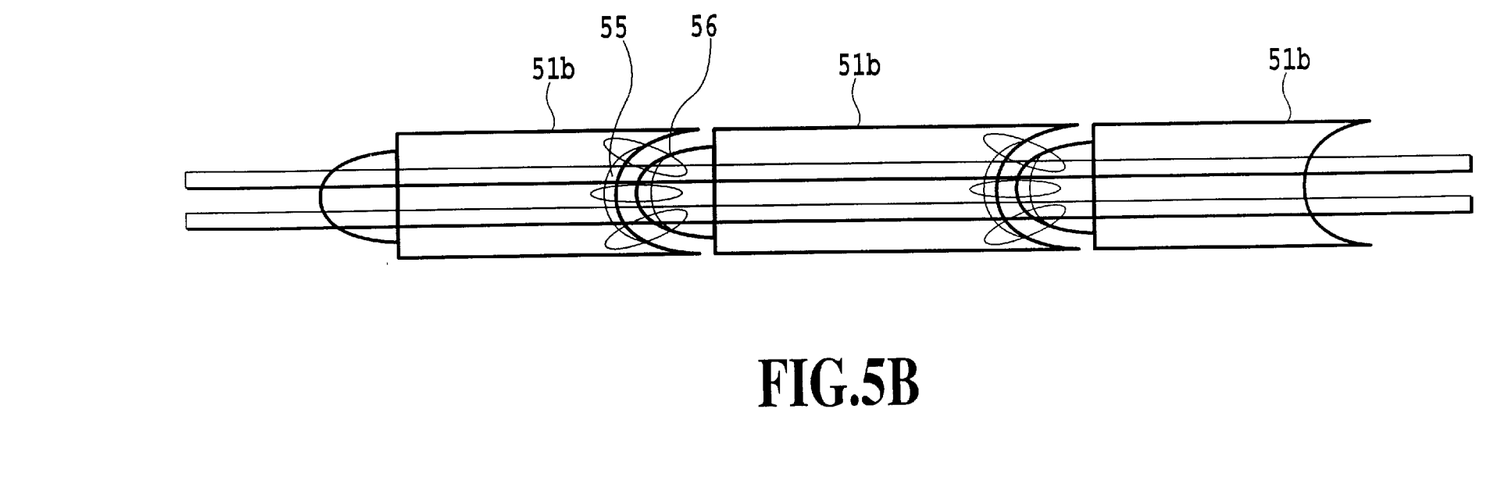

FIGS. 5A and 5B show a construction of a connection part for connecting respective transportation vehicles.

In FIG. 5A, connection parts 52 and 53 are equipped at a front and a rear of the respective rectangular transportation vehicle 51a. One connection part 52 (or 53) is made of a superconductor and the other connection part 53 (or 52) is made of a magnet, connection is achieved by the pinning effect of the superconductor.

FIG. 5B shows a structure for smoothly connecting a plurality of transportation vehicles 51b. Here, one connection part 55 has a concave structure and the other connection part a convex structure, and one connection part 55 (or 56) is made of a superconductor and the other connection part 56 (or 55) is of a magnet, thereby achieving connection by the pinning effect of the superconductor. With the above construction, even when the magnetic levitation guide is curved or in a circular form, the transportation vehicles 51b can smoothly travel. In addition to the pinning effect, connection of transportation vehicles by respective connection parts may be effected mechanically.

Further, according to the present invention, by providing a plurality of (several to tens of) transportation vehicles 1 for a single magnetic levitation guide 2, the capacity can be increased. Still further, the capacity can also be increased by employing a multiple of magnetic levitation guides by way of a plurality of rails.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A superconductive magnetic levitation transportation system, comprising:

a transportation vehicle provided with a transportation cabin loading a transportation cargo, a first magnetic levitation member including a superconductive bulk member, and a first coupling coil;

a magnetic levitation guide, having a second magnetic levitation member including a magnet opposing to said first magnetic levitation member and a second coupling coil magnetically coupled with said first coupling coil, for levitating said transportation vehicle;

a transportation passage surrounding said transportation vehicle and said magnetic levitation guide in a vacuum or a reduced pressure atmosphere and disposed to have a level difference;

connection parts having a superconductor at one end with respect to a traveling direction and a magnet at the other end, wherein a plurality of said transportation vehicles are connected with each other by said connection parts; and wherein said transportation vehicle is levitated on said magnetic levitation guide, with substantially no separate control to stabilize the position of the vehicle, by the superconductive pinning effect of said first magnetic levitation member of said transportation vehicle and said second magnetic levitation member of said magnetic levitation guide so that said transportation vehicle is traveled by potential energy according to the disposition of said transportation passage, and said transportation vehicle is stopped driving, held or positioned by said first coupling coil of said transportation vehicle and said second coupling coil of said magnetic levitation guide.

2. The superconductive magnetic levitation transportation system as claimed in claim 1, wherein said transportation vehicle further comprises a cold accumulator disposed in close contact with said superconductive member and a refrigerator or a coolant for cooling said cold accumulator.

3. The superconductive magnetic levitation transportation system as claimed in claim 2, wherein said magnet is a plurality of permanent magnets disposed along said magnetic levitation guide in a traveling direction with the same magnetic polarities.

4. The superconductive magnetic levitation transportation system as claimed in claim 2, wherein said magnet is a plurality of electromagnets disposed along said magnetic levitation guide in a traveling direction.

5. The superconductive magnetic levitation transportation system as claimed in claim 2, wherein said superconductive member is a yttrium type oxide superconductor ($YBa_2Cu_3O_x$) or a samarium type oxide superconductor ($SmBa_2Cu_3O_x$).

6. The superconductive magnetic levitation transportation system as claimed in claim 1, wherein said transportation vehicle comprises said first magnetic levitation member and said first coupling coil disposed on one side with respect to the levitating direction and further a third magnetic levitation member and a third coupling coil disposed on the other side, and said magnetic levitation guide comprises said second magnetic levitation member and said second coupling coil opposing to said first magnetic levitation member and said first coupling coil of said transportation vehicle, and a fourth magnetic levitation member and a fourth coupling coil opposing to said third magnetic levitation member and said third coupling coil of said transportation vehicle.

7. The superconductive magnetic levitation transportation system as claimed in claim 1, wherein said transportation vehicle further comprises a fifth magnetic levitation member and a fifth coupling coil on a side to which a centrifugal force is applied where said transportation passage is curved, and said magnetic levitation guide further comprises a sixth magnetic levitation member opposing to said fifth magnetic levitation member of said transportation vehicle.

8. The superconductive magnetic levitation transportation system as claimed in claim 1, wherein said transportation passage is further provided at opposite ends with a start area and an arrival area respectively partitioned by vacuum doors.

9. The superconductive magnetic levitation transportation system as claimed in claim 8, further comprising a second magnetic levitation guide disposed to be connected or branched to said magnetic levitation guide such that potential energy of an arrival area of said second magnetic levitation guide is different from that of said magnetic levitation guide.

* * * * *